United States Patent [19]

Stephens

[11] Patent Number: 5,219,925
[45] Date of Patent: Jun. 15, 1993

[54] MOLD RELEASE COMPOSITION AND METHOD OF COATING A MOLD CORE

[75] Inventor: William D. Stephens, Clearwater, Fla.

[73] Assignee: TSE Industries, Inc., Clearwater, Fla. ; a part interest

[21] Appl. No.: 917,772

[22] Filed: Jul. 21, 1992

[51] Int. Cl.$^5$ .............................................. C08L 83/06
[52] U.S. Cl. ................................... 524/860; 524/863; 524/188; 524/588; 252/182.33; 427/133; 427/134; 427/135
[58] Field of Search ............... 524/860, 863, 188, 588; 252/182.33; 427/133, 134, 135

[56] References Cited

U.S. PATENT DOCUMENTS

| | | | |
|---|---|---|---|
| Re. 32,318 | 12/1986 | Comper et al. | 106/38.22 |
| 3,684,756 | 8/1972 | Brooks | 260/29.1 SI |
| 3,894,881 | 7/1975 | Suzuki et al. | 106/287 SB |
| 3,905,823 | 9/1975 | Piskoti | 106/38.22 |
| 4,049,873 | 9/1977 | Creasey et al. | 428/447 |
| 4,532,096 | 7/1985 | Bogner et al. | 264/109 |
| 4,534,928 | 8/1985 | Martin | 264/334 |
| 4,624,899 | 11/1986 | Macaigne et al. | 428/447 |

*Primary Examiner*—Maurice J. Welsh
*Attorney, Agent, or Firm*—Herbert W. Larson

[57] ABSTRACT

An aqueous reaction mixture of a multi-functional polydimethyl siloxane emulsified polymer, a methyl triethoxy silane, a mixture of substituted nonyl or octyl phenol derivative surfactants and synthetic ethoxylated amine surfactants, and ethanol. The reaction mixture is coated on a mold core surface and cured with heat to form a mold release surface that can be used in excess of twenty times prior to recoating.

11 Claims, No Drawings

MOLD RELEASE COMPOSITION AND METHOD OF COATING A MOLD CORE

BACKGROUND OF THE INVENTION

1. Field of The Invention

This invention relates to organopolysiloxane mold release compositions. More particularly, it refers to such mold release compositions also containing a methyl triethoxy silane in an aqueous solution and methods for employing the composition in a mold.

2. Description of The Prior Art

In the process of preparing molded products such as urethanes, natural rubber, silicones, neoprene, and other synthetic elastomers, it is necessary to coat the core surfaces of molds to prevent the molded product from sticking to the mold. Coatings used to prevent such molded products from sticking to molds are called mold release agents. Some of the mold release agents previously used are solvent based, and some are water based. Polydimethylsiloxanes have been used as one of the ingredients in prior art mold release compositions, as well as methyl triethoxy silanes together with surfactants, and in many instances with a catalyst. In Reissue patent U.S. Pat. No. 32,318 describes an aqueous lubricating composition for time curing bladders containing polydimethylsiloxane, methyl hydrogen or methyl trimethoxy silane, a surfactant and a metal salt of an organic acid. Organic solvents were specifically excluded from the composition because they degraded the rubber surfaces and required frequency of recoat. U.S. Pat. No. 3,894,881 describes coating compositions applied to a plastic substrate for providing improved scratch resistance. These scratch resistant compositions contain a hydrolyzed silicon tetraalkoxide, a methyl trimethoxy silane, and a metal salt. U.S. Pat. No. 4,534,928 describes mold release compositions containing a polydimethylsiloxane, an alkoxysilane such as methyl trimethoxy silane, a metal alkoxide, and a non reactive volatile organic solvent which is substantially water-free.

Although these prior art mold release compositions have the ability to release molded products, they suffer from the need to recoat the molds frequently, have odor problems, or are toxic. A mold release composition is needed that is environmentally friendly and will permit greater than twenty releases of molded urethane, natural rubber, neoprene, and other synthetic elastomer for transfer, compression, and injection molding.

SUMMARY OF THE INVENTION

I have discovered a unique mold release composition which is non-toxic, environmentally friendly, and will allow greater than twenty releases of a molded urethane, silicone, natural rubber, neoprene, or other synthetic elastomer during compression or injection molding procedures.

My composition is an aqueous reaction mixture of a multifunctional polydimethyl siloxane emulsified polymer, a methyl triethoxy silane, substituted nonyl or octyl phenol derivative surfactants and synthetic ethoxylated amines, ethanol, and water. This reaction mixture can be coated on a mold core surface and cured with heat to form a semi-permanent mold release surface.

DETAILED DESCRIPTION OF THE INVENTION

The composition of this invention is a reaction mixture of a multi-functional organo-silane crosslinker, and multi-functional polydimethyl siloxane emulsified polymer in a solution of water and ethanol. This reaction mixture produces a reactive silane in a mixture of emulsified poly organo siloxanes forming an interpenetrating network on a mold core surface upon application of heat.

The composition contains the ingredients as a percent by weight in the following ranges:

| | |
|---|---|
| 0.5 to 12% | a silane selected from the group consisting of methyl triethoxy silane, methyl trimethoxy silane, vinyl triethoxy silane and vinyl trimethoxy silane, |
| 1 to 8% | a multi functional polydimethyl siloxane emulsified polymer, |
| 0.1 to 2.5% | substituted nonyl or octyl phenol derivative surfactant, |
| 0.1 to 2.5% | synthetic ethoxylated amine surfactant, |
| 1 to 8% | ethanol and |
| 70 to 97% | water. |

Three to five grams of the composition is applied to each square foot of a mold core surface and then heated to about 320 degrees F. to form the interpenetrating network.

The preferred composition is prepared by mixing the following ingredients (% by weight) in water:
3% methyl triethoxy silane,
1.8% deca methyl cyclopenta siloxane,
1.6% octa methyl cyclotetra siloxane,
0.6% dodeca methyl cyclo hexa siloxane,
1.5% surfactants which are a substituted nonyl or octyl phenol derivative and synthetic ethoxylated amines,
3.0% ethanol, and
88.5% water.

The methyl triethoxy silane reacts with the water to produce additional ethanol. The mixture is sprayed on a clean mold core surface and heated to 320 degrees F. to vaporize the water and coat the mold core.

The methyl triethoxy silane can be substituted with methyl trimethoxy silane, vinyl triethoxy silane or vinyl trimethoxy silane to achieve substantially the same results in the mixture and on spraying the resulting mixture on a mold core.

The following example exemplifies a method of preparing the composition of this invention and applying it to mold core surfaces.

EXAMPLE I 197 grams of distilled water was mixed with 23 grams of the mixture of siloxanes set forth above in the preferred composition and substituted nonyl and octyl phenol derivative and synthetic ethoxylated amine surfactant mixtures and 9.4 grams of methyl triethoxy silane. 120 grams of ethanol was mixed with 2725 grams of tap water, 30 grams of methyl triethoxy silane and 300 grams of the aforementioned siloxane and surfactant mixture. The two mixtures were then blended and sprayed on a four inch mold. Both sides of the mold were preheated to 320 degrees F. and cured for five minutes.

A polyether millable urethane compound was applied and cured in the mold and released twenty times with no noticeable sticking on the mold.

Additional mold release compositions were prepared in the manner of EXAMPLE I with the ingredients indicated by weight percent in the following EXAMPLES II–V.

EXAMPLE II

1% methyl triethoxy silane,
0.9% deca methyl cyclopenta siloxane,
0.8% octa methyl cyclotetra siloxane,
0.6% dodeca methyl cyclo hexa siloxane,
0.75% surfactants,
1.0% ethanol and
96.0% water.

EXAMPLE III

6% methyl triethoxy silane,
1.8% deca methyl cyclopenta siloxane,
1.6% octa methyl cyclotetra siloxane,
0.6% dodeca methyl cyclo hexa siloxane,
1.5% surfactants,
3.0% ethanol and
85.5% water.

EXAMPLE IV

8% methyl triethoxy silane,
3.6% deca methyl cyclopenta siloxane,
3.2% octa methyl cyclotetra siloxane,
1.2% dodeca methyl cyclo hexa siloxane,
3.0% surfactants,
6.0% ethanol and
75% water.

EXAMPLE V

12% methyl triethoxy silane,
3.6% deca methyl cyclopenta siloxane,
3.2% octa methyl cyclotetra siloxane,
1.2% dodeca methyl cyclo hexa siloxane,
3.0% surfactants,
6.0% ethanol and
71% water.

EXAMPLE VI

A mold was used that had an undercut and a difficult configuration to mold. In a mold such as this, molding compounds will easily stick and tear. The mold was first degreased and then sandblasted. Thereafter, the mold release composition of EXAMPLE I above, was sprayed on the mold in a thin coating heated to molding temperature. Each of the following fluoroelastomer molding compositions was separately applied to the mold and released from the mold after curing multiple times without tearing.

| MOLDING COMPOUND A | |
|---|---|
| INGREDIENTS | PHR |
| Viton E-60-C Dupont Fluoroelastomer | 100.0 |
| VPA No 3 Proprietary Viton Process Aid | 1.0 |
| Mag-D Magnesium Oxide | 3.0 |
| Calcium Hydroxide | 6.0 |
| N-990 Carbon black filler MT type | 30.0 |

| MOLDING COMPOUND B | |
|---|---|
| INGREDIENTS | PHR |
| Viton A401C Dupont Fluoroelastomer | 100.0 |
| Maglite D Magnesium Oxide | 3.0 |
| Calcium Hydroxide | 6.0 |
| Carnauba Wax | 1.0 |
| N-990 Carbon black filler MT type | 20.0 |
| Powdered Teflon MP-1500 | 10.0 |

| MOLDING COMPOUND C | |
|---|---|
| INGREDIENTS | PHR |
| Viton A401C Dupont Fluoroelastomer | 100.0 |
| Maglite D Magnesium Oxide | 3.0 |
| Calcium Hydroxide | 6.0 |
| Carnauba Wax | 1.0 |
| N-990 Carbon black filler MT type | 35.0 |

EXAMPLE VII

A steel mold designed with a difficult undercut was employed. Any sticking at the under cut will result in a tear. The mold was first degreased and then sandblasted. The mold was heated to the molding temperature and the mold release composition of EXAMPLE I above was sprayed in the mold. Each of the following two silicons elastomer molding compositions were separately applied to the mold and released from the mold after curing. Thirty moldings were performed and no sticking or tearing occurred.

| MOLDING COMPOUND D | |
|---|---|
| INGREDIENTS | PHR |
| General Electric Silicone SE-4404U | 100.0 |
| Titanium Dioxide | 1.0 |
| 2,5-Dimethyl-2,5-Di (t-butyl-peroxy) hexane | 1.0 |

| MOLDING COMPOUND E | |
|---|---|
| INGREDIENTS | PHR |
| General Electric Silicone SE-88U | 100.0 |
| Titanium Dioxide | 1.0 |
| 2,5-Dimethyl-2,5-Di (t-butyl-peroxy) hexane | 1.0 |

EXAMPLE VIII

A steel mold designed with a difficult undercut was employed. Any sticking at the undercut will result in a tear. The mold was first degreased and then sandblasted. The mold was heated to the molding temperature and the mold release composition of EXAMPLE I above, was sprayed on the mold in a thin coat. Each of the following two urethane gum molding compositions was separately applied to the mold and released from the mold after curing. Thirty moldings were performed and no sticking or tearing occurred.

| MOLDING COMPOUND F | |
|---|---|
| INGREDIENTS | PHR |
| Polyether/TDI Millable Urethane Gum | 50.0 |
| Butadine Acrylonitrile Copolymer | 35.0 |
| Styrene Butadiene Copolymer | 15.0 |
| Stearic Acid | 1.0 |
| Zinc Stearate | 0.5 |

-continued

| MOLDING COMPOUND F | |
|---|---|
| INGREDIENTS | PHR |
| N-550 FEF Carbon Black | 25.0 |
| N-770 SRF Carbon Black | 15.0 |
| Kaolin (hard) Clay (hydrated aluminum silicate) | 50.0 |
| Dioctyl Phthalate | 14.0 |
| Petroleum Hydrocarbon | 2.0 |
| Polymerized 1,2-Dihydro-2,2,4-Trimethylquinoline | 3.0 |
| Benzothiazyl Disulfide | 4.0 |
| 2-Mercaptobenzothiazole | 2.0 |
| Partial complex of Zinc Chloride & Benzothiazyl Disulfide | 1.0 |
| 99% Pure Sulfur Powder | 2.0 |

| MOLDING COMPOUND G | |
|---|---|
| INGREDIENTS | PHR |
| Polyether/TDI Millable Urethane Gum | 100.0 |
| Low Molecular Weight Polyethylene Powder | 2.0 |
| Zinc Stearate | 0.5 |
| Precipitated Hydrated Amorphous Silica | 35.0 |
| Coumarone-indene Resin | 10.0 |
| Teflon Powder MP-1500 | 1.0 |
| Naphthenic Oil | 1.0 |
| Blue Pigment in an EPDM binder 80% | 1.5 |
| Titanium Dioxide | 0.7 |
| Benzothiazyl Disulfide | 4.0 |
| 2-Mercaptobenzothiazole | 2.0 |
| Partial complex of Zinc Chloride & Benzothiazyl Disulfide | 1.5 |
| 99% Pure Sulfur Powder | 1.5 |

Having thus described the invention what I claim and desire to be secured by Letters Patent is:

1. An aqueous mold release composition for use in coating compression and injection molding core surfaces in contact with urethanes, silicones, natural rubber, neoprene and other synthetic elastomer, the composition comprising by weight:

| | |
|---|---|
| 0.5 to 12% | a silane selected from the group consisting of methyl triethoxy silane, methyl trimethoxy silane, vinyl triethoxy silane and vinyl trimethoxy silane, |
| 1 to 8% | a multi functional polydimethyl siloxane emulsified polymer, |
| 0.1 to 2.5% | substituted nonyl or octyl phenol derivative surfactant, |
| 0.1 to 2.5% | synthetic ethoxylated amine surfactant, |
| 1 to 8% | ethanol and |
| 70 to 97% | water. |

2. The aqueous mold release composition according to claim 1 wherein the composition comprises a mixture of less than ten percent by weight of methyl triethoxy silane, multifunctional polydimenthyl siloxane, emulsified polymer and the surfactant mixture together with about three percent by weight of ethanol and the remainder water.

3. The aqueous mold release composition according to claim 1 wherein the silane is methyl triethoxy silane.

4. The aqueous mold release composition according to claim 1 wherein the multifunctional polydimethyl siloxane emulsified polymer is a mixture of deca methyl cyclopenta siloxane, octa methyl cyclotetra siloxane, and dodeca methyl cyclo hexa siloxane.

5. An aqueous mold release composition for use in coating compression and injection molding core surfaces comprising a mixture of less than ten percent by weight of
 a silane selected from the group consisting of methyl triethoxy silane, methyl trimethoxy silane, vinyl triethoxy silane and vinyl trimethoxy silane,
 a multifunctional polydimethyl siloxane emulsified polymer,
 a surfactant compatible with the silane and siloxane, and about 2 to 4% ethanol and the remainder water.

6. The aqueous mold release composition according to claim 5 wherein the silane is methyl triethoxy silane.

7. The aqueous mold release composition according to claim 5 wherein the siloxane is a mixture of deca methyl cyclopenta siloxane, octa methyl cyclotetra siloxane and dodeca methyl cyclo hexa siloxane.

8. The aqueous mold release composition according to claim 5 wherein the surfactant is a mixture of substituted nonyl or octyl phenol derivatives and synthetic ethoxylated amine.

9. The aqueous mold release composition according to claim 5 wherein the ethanol is present at about 3% by weight.

10. The aqueous mold release composition according to claim 5 wherein the composition comprises by weight about:
 3% methyl triethoxy silane,
 1.8% deca methyl cyclopenta siloxane,
 1.6% octa methyl cyclotetra siloxane,
 0.6% dodeca methyl cyclo hexa siloxane,
 1.5% mixture of synthetic ethoxylated amines and nonyl or octyl phenol derivative surfactants,
 3.0% ethanol and
 88.5% water.

11. A method of forming a semi-permanent mold release surface on a mold core comprising cleaning the core surfaces, heating both sides of the core surfaces to about 320 degrees F. and spraying the mold core with an aqueous composition containing less than ten percent by weight of a mixture of a silane selected from the group consisting of methyl triethoxy silane, methyl trimethoxy silane, vinyl triethoxy silane and vinyl triethoxy silane, a multi-functional polydimethyl silicone emulsified polymer, and a surfactant, about 2 to 4% by weight, ethanol and the remainder water.

* * * * *

UNITED STATES PATENT AND TRADEMARK OFFICE
CERTIFICATE OF CORRECTION

PATENT NO. : 5,219,925

DATED : June 15, 1993

INVENTOR(S) : Stephens

It is certified that error appears in the above-identified patent and that said Letters Patent is hereby corrected as shown below:

IN THE CLAIMS

Column 6, line 54, "silicone" should be -- siloxane --.

Column 6, line 56, the coma after "weight" should be deleted.

Signed and Sealed this

Seventeenth Day of August, 1999

Attest:

Q. TODD DICKINSON

Attesting Officer

Acting Commissioner of Patents and Trademarks